Nov. 14, 1944.  W. P. COUSINO  2,362,469
INJECTION MOLDING APPARATUS
Filed Sept. 10, 1941
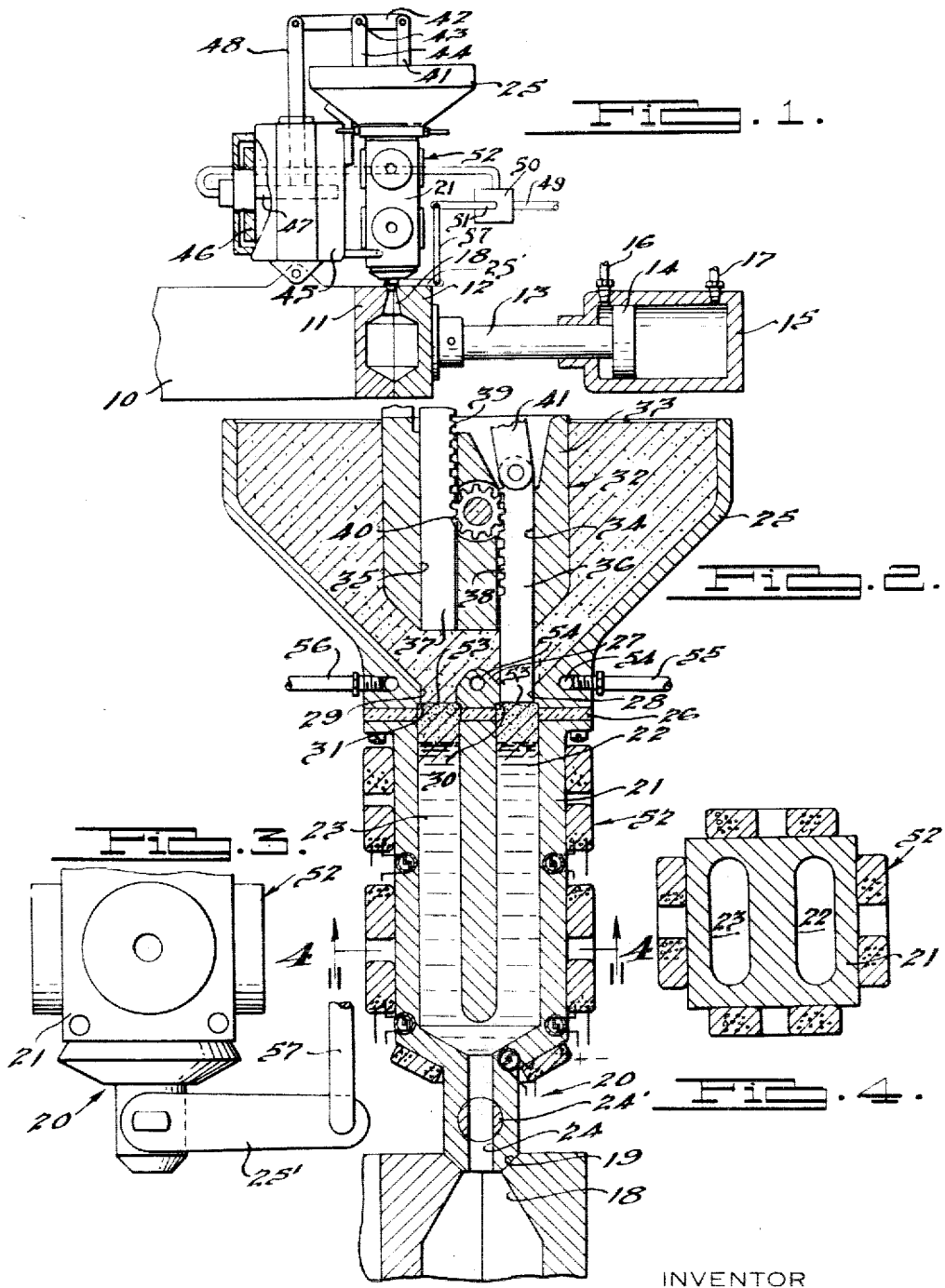
INVENTOR
Walter P. Cousino.
BY
ATTORNEYS.

Patented Nov. 14, 1944

2,362,469

UNITED STATES PATENT OFFICE 2,362,469

INJECTION MOLDING APPARATUS

Walter P. Cousino, Detroit, Mich., assignor to Chrysler Corporation, Highland Park, Mich., a corporation of Delaware Application September 10, 1941, Serial No. 410,233

6 Claims. (Cl. 18—30)

This invention relates to an improved plastic injection molding apparatus.

One of the main objects of the invention is the provision in apparatus of this kind of mechanism for displacing plastic material under compression which does not require close fits and tolerances of the order necessary in cylinder and piston pump type plastic displacing apparatus of conventional construction.

Another object of the invention is to provide plastic displacing mechanism in injection molding apparatus of this character which has a displacing plunger that operates in confined relation throughout only a small increment of its stroke with the walls of the passage from which it displaces plastic material.

A further object of the invention is to provide injection molding apparatus of this kind from which may be effectively injected into a mold charges of plastic material comprising in their solid state mixtures of diverse particle sizes including plastic dust, grains and larger fragmented particles of scrap plastic-like material.

A still further object of the invention is to provide a plastic displacing unit in injection molding of this kind which is adapted to displace from the nozzle of the apparatus a continuous stream of plastic-like material of moldable consistency.

An additional object of the invention is the provision of means in injection molding apparatus for utilizing the plastic material to produce, during the return stroke of the displacing element, a seal at the inlet end of the nozzle through which the plastic is discharged into a mold.

Another object of the invention is the provision of displacing and discharging apparatus of this kind by which plastic materials, including rubber, may be displaced through a die in an extruding operation.

Other objects of the invention are to provide cooling and heat insulating means at the outlet end of a plastic displacing device of this kind which facilitates the retention of the last increments of plastic operated upon by a displacing element in a compressed cake-like formation of substantially unfused solid particles between successive strokes of the displacing elements; to provide an abutment at the junction of the discharge nozzle and pump portion of apparatus of this character against which the cake-like formation of plastic-like particles seats to form a seal; to provide a control valve at the outlet end of the nozzle by which the quantity of plastic discharged therefrom may be governed; to provide interconnecting mechanism between the above mentioned control valve and an operating control for the displacing mechanism, by which the pump is started when the valve is opened and stopped when the valve is closed; and to provide means for heating the plastic during its passage through the nozzle to a state of free flowing and moldable consistency.

An additional object of the invention is the provision of injection molding apparatus which is adapted to inject plastic-like materials of diverse kinds including thermoplastic and thermosetting plastic materials as well as rubber and synthetic rubber compounds.

An illustrative embodiment of the invention is shown in the accompanying drawing in which:

Fig. 1 is a side elevational view, partly in section, of injection molding apparatus embodying the invention.

Fig. 2 is a fragmentary vertical sectional view of the plastic discharge and nozzle structure of the molding apparatus shown in Fig. 1.

Fig. 3 is a fragmentary side elevational view of the discharge end of the nozzle structure.

Fig. 4 is a horizontal sectional view taken on the line 4—4 of Fig. 2.

In Fig. 1 of the drawing is illustrated diagrammatically a molding apparatus embodying the invention which includes a support 10 having a mold section 11 attached to one end thereof. A cooperative mold section 12 is carried by a piston rod 13 having a piston 14 at its right extremity reciprocably mounted in a cylinder 15. The interior of the cylinder 15 is communicatively connected by pipes 16 and 17 with a source of compressed air or other fluid under pressure (not shown). The fluid medium may be supplied through the pipe 17 to the right end portion of the cylinder 15 in order to forcefully hold the mold section 12 in operative contact with the mold section 11. The mold section 12 may be withdrawn from the mold section 11 in order to accommodate removal of a molded piece of work by exhausting the fluid medium through the pipe 17 and admitting fluid under pressure into the left end of the cylinder 15 through the pipe 16. The particular mold supporting and operating structure is shown in the drawing as indicative only of one form of mold structure with which my improved plastic injection mechanism is adapted to be employed, it being understood that various types of mold supporting and operating devices may be used while obtaining the benefits and advantages of the improved injection apparatus.

When the mold sections 11 and 12 are in operative contacting relationship, there is provided a conical gate 18 having a tapered inlet portion 19 against which the nozzle, generally designated by the numeral 20, is adapted to seat in order to deliver plastic-like material to the interior of the mold. In the form of the invention shown in the drawing, the nozzle 20 moves a body portion 21 in which are formed two axially extending passages 22 and 23 which are joined at their lower extremity and which communicate with an outlet passage 24 formed in the discharge end of the nozzle. A valve 24' having an operating lever 25' is provided in the discharge passage 24 for the purpose of controlling the flow of moldable plastic material into the mold. Mounted on the upper extremity of the nozzle body portion 21 is a hopper 25 which is preferably heat insulated from the body portion of the nozzle by a layer of insulating material 26. Satisfactory insulation of the hopper from the nozzle may be effected by providing a deep groove between the nozzle and hopper structures and leaving only a narrow ring of metal directly therebetween in order to space the main portions of the nozzle and hopper apart.

Formed in the lower extremity of the hopper 25 is a transverse wall 27 having passageways 28 and 29 formed therein which are aligned with the passages 22 and 23, respectively, of the nozzle. Both the nozzle passages 22 and 23 and the passageways 28 and 29 at the lower extremity of the hopper are of generally rectangular shape having rounded extremities as illustrated in Fig. 4. At least the widths of the passages 22 and 23 are formed to greater dimensions than the corresponding widths of the passages 28 and 29 in order to provide abutments or shoulders 30 and 31 at the outlet ends of the passageways 28 and 29, respectively. The cross sectional lengths of the rectangular passageways 22 and 23 may also, if desired, exceed the corresponding cross sectional lengths of the passageways 28 and 29 in order to provide abutments or shoulders at the extremities of the cross section of the outlet ends of the passageways 28 and 29. The abutments 30 and 31 face away from the interior of the hopper 25 and, as hereinafter more clearly set forth, cooperate with the plastic material in performing a self-sealing action which prevents the reverse flow of plastic material from the nozzle and into the hopper. Disposed in the hopper 25 is plastic displacing mechanism, generally designated by the numeral 32, which includes a body portion 33 having guideways 34 and 35 in which are reciprocably mounted plungers 36 and 37. The plungers 36 and 37 are aligned with the passageways 28 and 29 and are so shaped as to extend therethrough in relatively loose fitting relation with respect to the walls of the latter passageways. Formed on the adjacent sides of the plungers 36 and 37 are rack teeth 38 and 39 which are meshed with the teeth of a pinion 40 journalled in the body structure 33 at a location between the plungers 36 and 37. The plunger 36 is operatively connected by a ring 41 with a lever 42 pivotally mounted at 43 on a support 44. The lever 42 may be oscillated by any suitable operating mechanism in order to reciprocate the plunger 36 which is in turn geared through the pinion 40 to the rack teeth 39 of the plunger 37 in such a relation as to cause the latter plunger to be returned from a discharge stroke when the plunger 36 is urged downwardly through its discharging stroke. The plunger 37 is thus urged downwardly through its discharge stroke while the plunger 36 is being moved upwardly by the lever 42.

For the purpose of illustration, there is shown in Fig. 1 an operating mechanism comprising a reciprocating air motor 45 having a cylinder 46 provided with a piston 47 which is connected by a piston rod 48 with the left extremity of the lever 42. Air is alternately supplied to and exhausted from respectively opposite ends of the cylinder 46 under the control of suitable valve mechanism with which reciprocating air motors of this kind are conventionally provided. Air or other fluid medium under pressure is fed to the motor through a conduit 49 in which is provided a control valve 50 having an operating lever 51.

The major portions of the reciprocative stroke of the plungers 36 and 37 occur within the unconfined space in the hopper 25 which is normally filled with solid particles of plastic-like material. Only the lower end portions of these plungers extend into and travel in the passageways 28 and 29. Thus, the plungers operate in confined relation with respect to the walls of the passages 28 and 29 throughout only short effective strokes. Inasmuch as the major portions of the respective strokes of the plungers occur in the hopper and with the plungers 36 and 37 so geared together by the pinion 40 as to cause one plunger to be located at the upper limit of its stroke while the other plunger is located at the lower limit of its stroke, as shown in Fig. 1, one plunger is moved throughout a substantial part of the hopper portion of its stroke after the other plunger has been withdrawn from the passageway with which it is alined. Therefore, the movement of one plunger through the hopper agitates the plastic-like material while the other plunger is withdrawn from its alined passageway, thereby assuring the flow of plastic-like material into the latter passageway preparatory to the next successive discharge therefrom. Each time one of these plungers is projected into its associated passage in the bottom wall of the hopper, it displaces from the hopper an increment of the charge of solid particles of plastic-like material and compresses this increment of the charge into a solid cake-like formation which seats against the shoulders or abutments 30 and 31 to provide a seal at the outlet end of the passageway for preventing reverse flow of plastic material from the nozzle back into the hopper. Thus, while one plunger is undergoing its return stroke, the cake-like formation of solid particles of plastic-like material acts as a valve or seal until the plunger is again propelled through its discharge stroke to project another increment of the charge into the nozzle and to thus produce another cake-like formation of solid particles of plastic-like material. Since the plastic-like material itself serves this sealing function, it is not necessary to have a close fitting relationship between the sides of the plungers and the walls of the passages 28 and 29 in which they operate nor is it necessary to employ mechanical valve mechanism of any kind for maintaining under compression plastic previously fed to the passages 22 and 23 of the nozzle.

In order to convert the solid particles of plastic-like material to a flowable state of moldable consistency, heat is applied to the nozzle throughout its main length by heating elements, generally designated by the numeral 52. These heating elements may comprise coils of an electrical resistance wire, steam coils or any other suitable form of heating means. To prevent the heat supply to the main length of the nozzle from softening or otherwise detrimentally effecting the cake-like formations of solid particles of plastic material, designated by the numeral 53 in Fig. 2, the bottom transverse wall structure of the hopper, in which the passageways 28 and 29 are formed, is cored out as illustrated at 54 to admit of the circulation of a cooling medium such as cold water throughout this wall structure. The insulation 26 also serves to prevent direct and exclusive transmission of heat from the nozzle to the wall structure of the hopper in which the passages 28 and 29 are formed and adjacent which the foregoing seals are produced by the cake-like formations 23 of solid particles of plastic-like material. Cooling medium is circulated through the cored out passages of the bottom wall 27 of the hopper by inlet and outlet pipes 55 and 56 respectively.

During operation of the foregoing plastic molding apparatus, it is not necessary to employ the control valve 24' for the purpose of cutting off the discharge of plastic material from the hopper for the fluid pressure applied on the reciprocating motor 45 may be predetermined to produce a desired degree of compression upon the plastic material in the mold and after the mold has been filled and the plastic material therein compressed to a predetermined extent, the back pressure exerted through the plastic may, if desired, be relied upon to stall the air motor. The valve 24' is, however, useful for the purpose of closing the discharge passage 24 of the nozzle during the period that the mold is not in operation. If it is not desired to rely upon the back pressure to stall the air motor, the operating lever 51 of the control valve 50 in the fluid medium line 49 may be operatively connected by a linkage 57 with the operating lever 25' of the valve 24'. This linkage may be so constructed and arranged as to cut off the supply of fluid under pressure to the motor 45 when the valve 24' is closed and to open the valve 50 so as to supply fluid under pressure to the motor 45 when the valve 24' is open.

In operation of molding apparatus embodying my invention, the hopper is kept filled with solid particles of plastic-like material which may comprise particles of granular or dust sizes or larger particles of broken up scrap material. Mixtures of such particles may be successfully discharged by the improved plastic discharge mechanism for the reason that the customary close and precision fitting relationship of a piston and cylinder type pump is not required and the problem of avoiding scoring of such pump cylinders is not present. While only two displacing plungers are disclosed in the embodiment of the invention illustrated in the drawing, it should be understood that any number of such plungers may be employed by providing a corresponding number of passageways such as the passageways 28 and 29 for their accommodation. A single plunger may be used particularly in the injection molding of small articles wherein molds of small capacity may be rapidly filled. The cooling of the locations at which the seals against reverse flow of plastic through the nozzle are provided enables the apparatus to remain idle for relatively long periods of time without resulting in breaking down of the cake-like formations of solid particles of plastic-like material by subjecting them to softening temperatures. The speed of operation of the plastic displacing elements may be so predetermined as to fill a mold of desired capacity within the time required to avoid premature hardening or solidification of the portions of plastic initially injected into the mold.

In the injection molding of thermoplastic materials, it may, as in conventional practice, be found desirable to cool the mold in order to solidify the injected plastic material rapidly before separation of the mold sections 11 and 12 and while the charge is held under compression therein. In the molding of thermosetting materials which require the application of heat in order to convert them to a solid state, it may be found desirable to heat the mold while the plastic is maintained under compression therein. Mold sections which can be readily removed from the molding apparatus and placed in an oven in order to cure thermosetting material of rubber or rubber-like status may in some instances be used to advantage in speeding up the rate of molding articles with the foregoing apparatus.

The foregoing plastic discharge apparatus may be employed to project in a mobile state plastic materials of substantially all characters, including rubber compounds, through an extrusion die. In the extrusion of cylindrical stock, for example, the discharge from the outlet 24 may be received by a suitable support or container (not shown) and heat cured or solidified by cooling or otherwise depending upon the properties of the plastic material.

Although but one specific embodiment of the invention is herein shown and described, it will be understood that various changes in the size, shape and arrangement of parts may be made without departing from the spirit of the invention.

I claim:

1. Injection apparatus for molding plastic-like material including a hopper for such material, a discharge nozzle, a pair of relatively short passageways connecting the interiors of said hopper and nozzle, a pair of reciprocative displacing elements disposed in said hopper each in alinement with one of said passageways and each having a portion of its stroke in part of said hopper and the remaining portion in the passageway with which it is aligned respectively, and mechanism for alternately driving each of said displacing elements through a plurality of relatively short discharge strokes while the other element is returned from a previous discharge stroke to displace a substantially continuous stream-like discharge from said nozzle sufficient to fill a mold of predetermined capacity said displacing elements and driving mechanism being so constructed and arranged with respect to said hopper and passageways that one of said elements traverses a substantial part of the hopper portion of its discharge stroke after the other element has been withdrawn from its passageway in order to agitate the material in said hopper and cause it to flow into said latter passageway.

2. Injecting apparatus for molding plastic-like material comprising a hopper for solid particles of such material, an outlet passageway leading from said hopper having a portion adjacent the latter of smaller cross sectional area than the next succeeding portion and having a shoulder between said portions of said passageway provided with a flat side facing away from said hopper and extending substantially at right angles to the wall of said passageway, a reciprocable displacing element disposed in said hopper in alinement with said smaller portion of said passageway and having relatively close fitting engagement with the wall thereof for forcing particles of solid material therethrough and compressing the same into a cake-like formation, said cake-like formation being engageable with said flat side for sealing said smaller portion of said passageway against reverse flow of said material therethrough, a nozzle having a discharge passage communicating with the end of said passageway remote from said hopper, and means for reciprocating said displacing element.

3. Injecting apparatus for discharging plastic-like material comprising a hopper for particles of such material, a pair of outlet passageways leading from said hopper, each having a portion adjacent the latter of smaller cross sectional area than the next successive portion and each having a shoulder between the portions thereof of different cross sectional area provided with a substantially flat side facing away from said hopper and extending substantially at right angles to the wall of the passageway, a pair of reciprocative plungers disposed in said hopper each in alinement with one of said passageways and each having a portion of its stroke in part of said hopper and the remaining portion in the passageway with which it is alined respectively for forcing particles of solid material therethrough and compressing the same into a cake-like formation; said cake-like formation being engageable with said flat side of the shoulder of one passageway for sealing the smaller portion of the latter against reverse flow of said material therethrough during discharge of plastic-like material through the other passageway, a nozzle having a discharge passage communicating with said passageways, and driving mechanism for alternately propelling said plungers through their respective discharge strokes, said driving mechanism being adapted to propel one plunger through a portion of said hopper while the other plunger is displaced from its alined passageway in order to agitate plastic-like material of said hopper into the latter passageway.

4. Apparatus for injecting plastic-like material comprising a hopper for such material, a nozzle having a discharge passage, a passageway communicatively connecting said nozzle discharge passage and said hopper, means for displacing said material from said hopper and forcing it through said nozzle discharge passage, mechanism for driving said displacing means, a valve for controlling the flow of plastic-like material through said nozzle discharge passage, a control for said driving mechanism, and means interconnecting said valve and said driving mechanism control so constructed and arranged as to shift the latter to render said driving mechanism operative and inoperative when said valve is opened and closed respectively.

5. Injection apparatus for molding plastic-like material including a hopper for such material, a discharge nozzle, a relatively short passageway connecting the interiors of said hopper and nozzle, a reciprocative displacing element disposed in said hopper in alignment with said passageway and having a portion of its displacing stroke in part of said hopper and the remaining portion of its displacing stroke in said passageway, mechanism for driving said displacing element through a plurality of relatively short reciprocations to displace a charge of plastic sufficient to fill a mold of predetermined capacity, a valve at the outlet end of said nozzle for controlling the flow of plastic-like material therefrom, a control for said driving mechanism, and means interconnecting said valve and said driving mechanism control so constructed and arranged as to shift the latter to render said driving mechanism operative and inoperative when said valve is opened and closed respectively.

6. Apparatus for injecting moldable material, comprising a nozzle having a discharge passage, a passageway communicatively connected at one end with said discharge passage and having an inlet for said material spaced from said end, means for forcing said material through said passageway and nozzle discharge passage under pressure, a valve for controlling the flow of said material through said nozzle discharge passage, a member for controlling said means, and mechanism interconnecting said valve and said control member so constructed and arranged as to shift the latter to render said moldable material forcing means operative and inoperative when said valve is opened and closed, respectively.

WALTER P. COUSINO.